United States Patent
Dixit et al.

(10) Patent No.: US 8,082,140 B2
(45) Date of Patent: Dec. 20, 2011

(54) PARAMETRIC ANALYSIS OF REAL TIME RESPONSE GUARANTEES ON INTERACTING SOFTWARE COMPONENTS

(75) Inventors: Manoj G. Dixit, Bangalore (IN); Ramesh Sethu, Bangalore (IN); Pallab Dasgupta, Kharagpur (IN)

(73) Assignee: GM Global Technology Operations LLC, Detroit, MI (US)

( * ) Notice: Subject to any disclaimer, the term of this patent is extended or adjusted under 35 U.S.C. 154(b) by 917 days.

(21) Appl. No.: 12/104,073

(22) Filed: Apr. 16, 2008

(65) Prior Publication Data

US 2009/0265147 A1    Oct. 22, 2009

(51) Int. Cl.
*G06F 17/50*    (2006.01)
(52) U.S. Cl. .......................................... 703/19
(58) Field of Classification Search ............... 703/19
See application file for complete search history.

(56) References Cited

U.S. PATENT DOCUMENTS
2007/0010901 A1    1/2007    Fukui

FOREIGN PATENT DOCUMENTS
EP        0 474 359 A2    3/1992
EP        0 463 729 B1    7/1998

OTHER PUBLICATIONS

Chaiwat Sathawornwichit, Takuya Katayama, "A Parametric Model Checking Approach for Real-Time Systems Design," 12th Asia-Pacific Software Engineering Conference (APSEC'05), 2005, pp. 584-594.

Rajeev Alur, Kousha Etessami, Salvatore La Torre, Doron Peled, Parametric temporal logic for "model measuring", ACM Transactions on Computational Logic (TOCL), v. 2 n. 3, p. 388-407, Jul. 2001.

*Primary Examiner* — Hugh Jones
(74) *Attorney, Agent, or Firm* — John A. Miller; Miller IP Group, PLC

(57) ABSTRACT

A system and method for providing control timing for a vehicle system at the design level. The method includes defining component timing specifications in a parametric form at a system level and at a sub-system level; mathematically representing the timing specifications in a system model; providing a constraint extraction algorithm that extracts timing constraints from the mathematical representations; using the constraint extraction algorithm to generate a plurality of linear equations that define the constraints; solving for real time constraint ranges from parameters in the linear equations; and selecting values from the real time constraint ranges to be used in the mathematical representations. In non-limiting embodiments, the constraint extraction algorithm can be a boundary discovery algorithm or a proof-tree.

16 Claims, 6 Drawing Sheets

PARAMETRIC ANALYSIS OF REAL TIME RESPONSE GUARANTEES ON INTERACTING SOFTWARE COMPONENTS

BACKGROUND OF THE INVENTION

1. Field of the Invention

This invention relates generally to a system and method for determining component and device timing in the control architecture of a vehicle system and, more particularly, to a system and method for determining the desirable bounds on the required timing response of various controllers, actuators and sensors in a vehicle system at the system design level.

2. Discussion of the Related Art

Driver assistance systems and vehicle active safety systems are becoming an integral part of vehicle design and development in an attempt to reduce driving stress and to enhance vehicle/roadway safety. For example, adaptive cruise control (ACC) systems are known that relieve drivers from routine longitudinal vehicle control by keeping the vehicle a safe distance away from a preceding vehicle. Also, collision avoidance systems are known that monitor traffic and objects around a vehicle and provide warnings and/or take preventative measures if a potential collision situation is detected.

These systems employ various sensors, actuators and detectors that monitor vehicle parameters, and controllers that control vehicle systems and devices, such as active front and rear wheel steering, differential braking, power steering operation, airbag deployment, etc. Timing control for the vehicle components and devices is a vital concern when designing such systems. Various devices and components require a certain amount of time to activate and some regulations may require that certain safety systems operate within a certain time frame. It has generally been the case that the timing control between the various devices and components in these types of vehicle systems has been identified in the software implementation and during deployment of the system. However, such a design scheme has not always provided the most desirable results.

SUMMARY OF THE INVENTION

In accordance with the teachings of the present invention, a system and method are disclosed for determining desirable response time bounds on interacting software components of a system at the design level. The method includes defining component timing specifications in a parametric form, where if a response time of a component is not known, then it is modeled as a parameter, at a system level and at a sub-system level. The method mathematically represents the timing specifications in a system model, provides a constraint extraction algorithm that extracts timing constraints from the mathematical representations, and uses the constraint extraction algorithm to generate a plurality of linear equations that define the constraints on response time requirements of interacting components to achieve the desired system functionality, such as timing bounds on end-to-end latency for component interaction. The method then solves for real time constraint ranges from parameters in the linear equations, and selects values from the real time constraint ranges to be used in the mathematical representations. In non-limiting embodiments, the constraint extraction algorithm can be a boundary discovery algorithm or a proof-tree.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for determining timing for devices and components in a system at the design level is merely exemplary in nature, and is in no way intended to limit the invention or its applications or uses.

Figure 1:
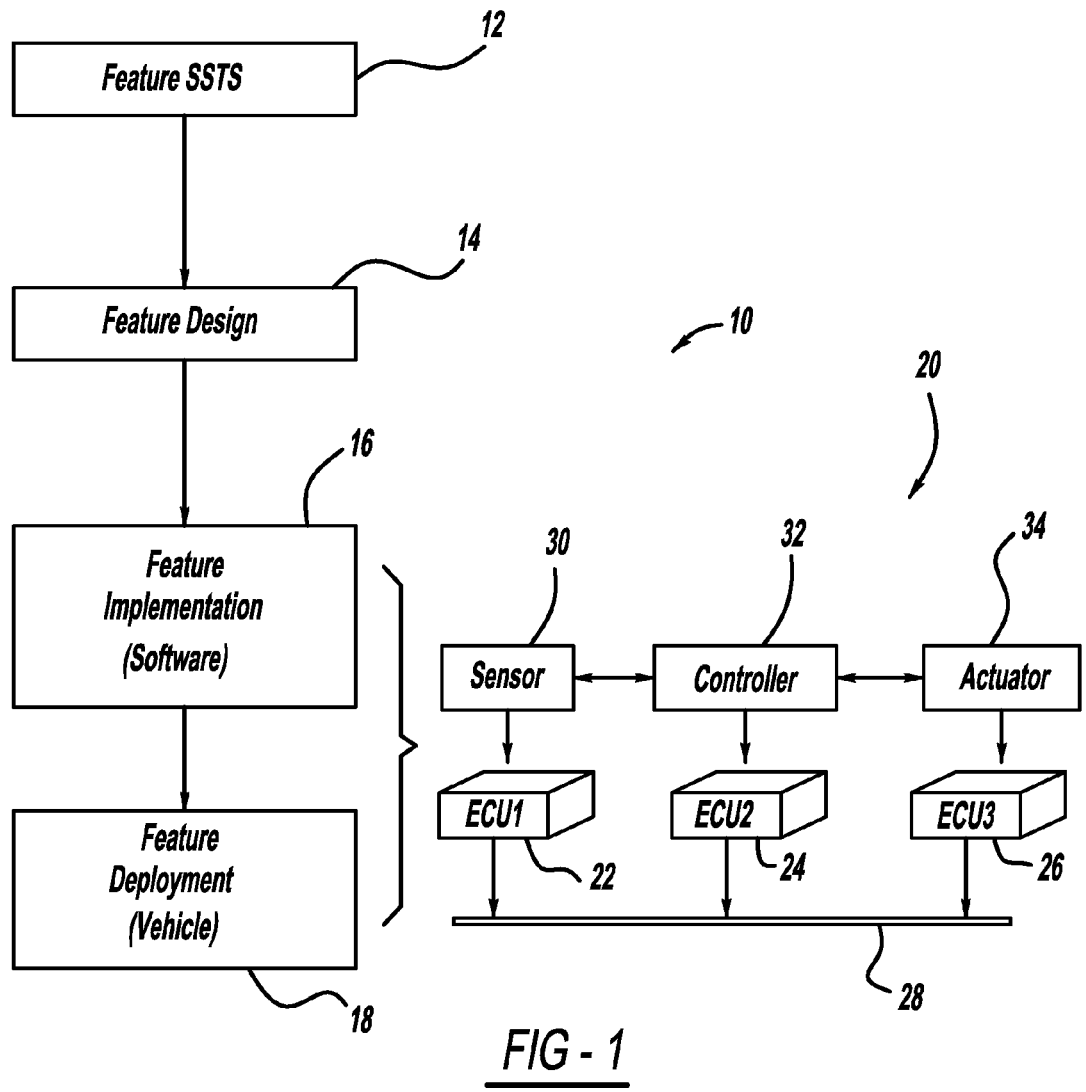
FIG. 1 is a block diagram showing a process for designing a vehicle system from initial conception to deployment.

FIG. 1 is a block diagram 10 showing a process of conception to implementation of a vehicle system, such as an adaptive cruise control system. At a lower level of the design process, features for sub-system technical specifications (SSTS) are identified at box 12 that define the specifications for the system being developed. Using the SSTS, an engineer will identify feature designs at box 14. The feature designs will be implemented in software at box 16 and be deployed on a vehicle at box 18. The implementation of the software and the deployment of the specifications on the vehicle are then used in a particular system 20 that includes a plurality of electronic control units (ECUs) 22, 24 and 26 in communication with each other on a controller area network (CAN) bus 28. Through the feature implementation and deployment, various sensors 30, controllers 32 and actuators 34 operate within the particular system, and have a relative time to each other that needs to be optimized for the desired implementation of the system. For example, if the particular system is a collision avoidance system, proper timing for deployment of the airbags and the like by a particular actuator 34 needs to be accurately provided.

The present invention proposes modeling the SSTS at the design level, well before implementation, so that timing inaccuracies can be addressed early. For example, in the event of a collision, certain collision avoidance systems will deactivate the power steering and deploy the airbags in less than 40 ms. Both deactivation of the power steering and deploying the airbags have component limitations on how fast they can react, which needs to be considered in the system design. As will be discussed in further detail below, the requirements for deactivating the power steering and the airbags, for example, will be modeled mathematically. Although these timing relationships are being used as a specific example, the present invention has application for other systems besides vehicle systems, such as in a plant to determine the appropriate response time of robots for correct functioning. In other scenarios, the invention may even be used to determine the appropriate timing configuration of different stages within an assembly line.

Figure 2:
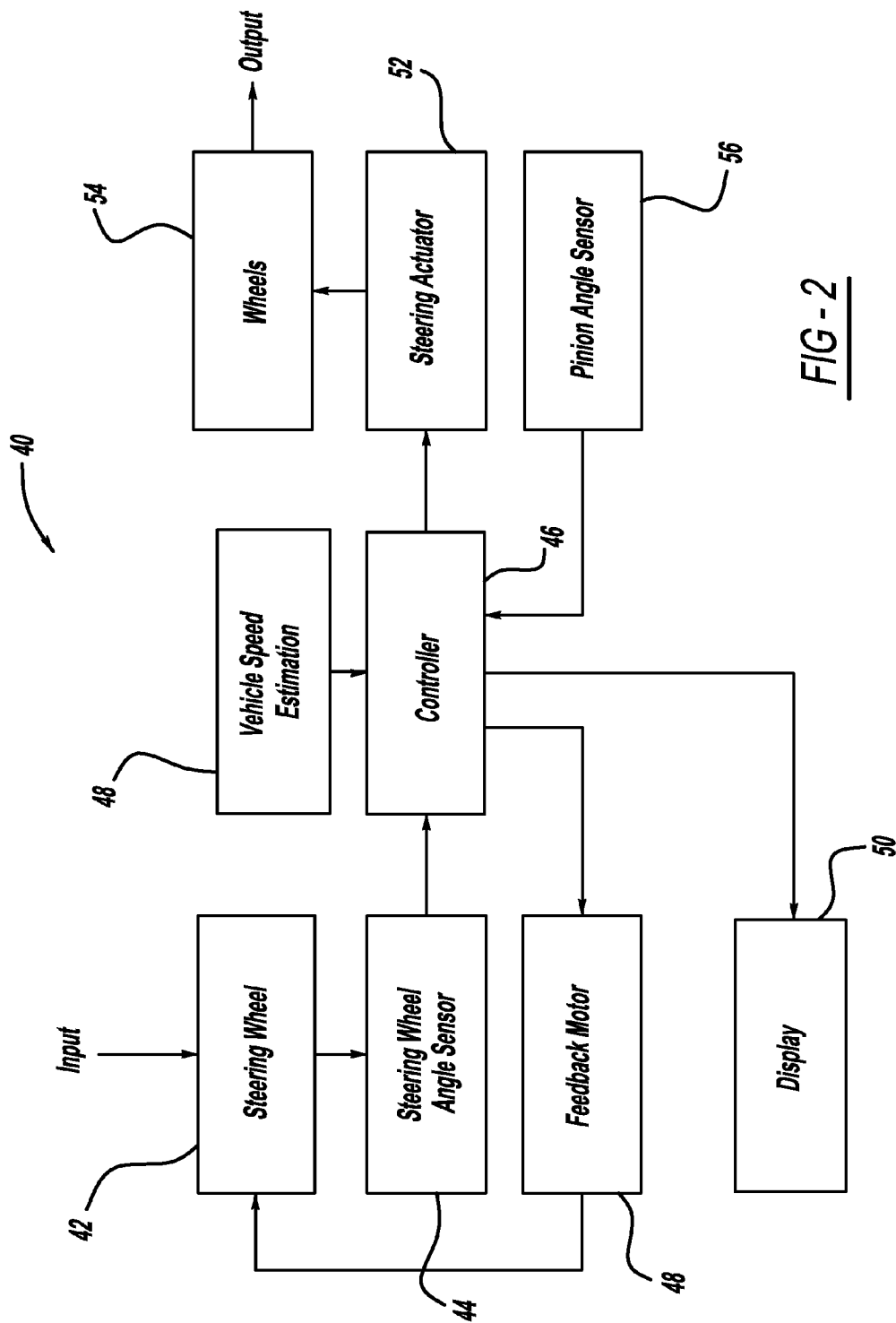
FIG. 2 is a block diagram showing a process of how sub-system level events add up so that system level real time responses are met.

In order to provide the modeling discussed above, constraints are employed in the modeling process to determine the desired timing of the operation and devices of the system. Such a determination of the constraints can be shown by, for example, a steer-by-wire vehicle. FIG. 2 is a block diagram representing a steer-by-wire system 40 that includes a steering wheel 42 providing a steering angle that is detected by a steering wheel angle sensor 44, which provides a steering signal to a steering wheel controller 46. The steering wheel controller 46 also receives an estimated vehicle speed signal from a vehicle speed estimation block 48 and provides a signal to a feedback motor 48 that provides resistance against the turning of the steering wheel 42. Further, the steering angle is displayed on a display 50. The controller 46 also sends a signal to a steering actuator 52 that provides a steering signal to the wheels 54 of the vehicle. A pinion angle sensor 56 detects the position of the wheels 54, and provides a feedback signal to the controller 46.

The steer-by-wire system 40 has certain specifications that must be met in order for the implementation of the system 40 to be proper. For example, in one known design, a change in the steering angle position provided by the steering wheel 42 needs to cause the wheels 54 to turn within 40 ms, referred to herein as system specification $A_1$, and the vehicle driver should feel the feedback resistance from the feedback motor 48 within 20 ms, referred to herein as system specification $A_2$. Sub-system specifications can be defined as $R_1$, once the steering angle position is changed, the controller 46 shall recalculate the road wheel position and update the road wheel actuator; $R_2$, once a new road wheel angle is received, the actuator shall alter the position of the road wheels 54; $R_3$, once the steering angle position is changed, the controller 46 shall recalculate the feedback resistance to be felt by the driver; and $R_4$, the feedback motor 48 shall adjust the driver resistance to be felt by the driver.

The change in the steering angle position specification $A_1$ and the driver feeling the feedback resistance specification $A_2$ can be modeled as:

$$A_1: G(\text{swAlter} \Rightarrow F_{\leq 40}(\text{gwTurn})) \tag{1}$$

$$A_2: G(\text{swAlter} \Rightarrow F_{\leq 20}(\text{swFeed})) \tag{2}$$

The sub-system level specifications $R_1$, $R_2$, $R_3$ and $R_4$ can be modeled as:

$$R_1: G(\text{swAlter} \Rightarrow F(\text{gwAdjust})) \tag{3}$$

$$R_2: G(\text{gwAdjust} \Rightarrow F(\text{gwTurn})) \tag{4}$$

$$R_3: G(\text{swAlter} \Rightarrow F(\text{swAdjust})) \tag{5}$$

$$R_4: G(\text{swAdjust} \Rightarrow F(\text{swFeed})) \tag{6}$$

From the system level specifications $A_1$ and $A_2$, the sub-system level specifications $R_1$, $R_2$, $R_3$ and $R_4$ can be further modeled as:

$$R_1: G(\text{swAlter} \Rightarrow F_{\leq 10}(\text{gwAdjust})) \tag{7}$$

$$R_2: G(\text{gwAdjust} \Rightarrow F_{\leq 20}(\text{gwTurn})) \tag{8}$$

$$R_3: G(\text{swAlter} \Rightarrow F_{\leq 10}(\text{swAdjust})) \tag{9}$$

$$R_4: G(\text{swAdjust} \Rightarrow F_{\leq 10}(\text{swFeed})) \tag{10}$$

Equations (7)-(10) can then be modified to characterize the timing relationship between intermediate events to obtain closed form representations of a solution set as:

$$R_1: G(\text{swAlter} \Rightarrow F_{\leq x_1}\text{gwAdjust})) \tag{11}$$

$$R_2: G(\text{gwAdjust} \Rightarrow F_{\leq x_2}(\text{gwTurn})) \tag{12}$$

$$R_3: G(\text{swAlter} \Rightarrow F_{\leq x_3}(\text{swAdjust})) \tag{13}$$

$$R_4: G(\text{swAdjust} \Rightarrow F_{\leq x_4}(\text{swFeed})) \tag{14}$$

$$R_1 \wedge R_2 \Rightarrow A_1 \tag{15}$$

$$R_3 \wedge R_4 \Rightarrow A_2 \tag{16}$$

The above system of parametric temporal logic equations (11)-(14) is such that any solution to constraints extracted from it on parameters $x_1$, $x_2$, $x_3$ and $x_4$ constrains events in such a way that timed design intent is met. The sub-system level specifications $R_1$, $R_2$, $R_3$ and $R_4$ can then be refined, such as, the specification $R_1$ can be defined as:

$$R'_1: G(\text{swAlter} \Rightarrow F_{\leq y_1}(\text{swPos})) \tag{17}$$

$$R''_1: G(\text{swPos} \Rightarrow F_{\leq y_2}(\text{swAdjust})) \tag{18}$$

From the specifications, constraints can be defined as:

$$x_1 + x_2 \leq 40 \tag{19}$$

$$x_3 + x_4 \leq 20 \tag{20}$$

$$y_1 + y_2 \leq x_1 \tag{21}$$

From this, worst case response time bounds for steer-by-wire control and other actions can be determined by knowing the minimum $l_s$ and maximum $m_s$ response time bounds on the steering wheel sensor, and the minimum $l_s$ and maximum $m_s$ response time bounds on the road wheel actuator, such as:

max $y_2$, subject to:

$x_1 + x_2 \leq 40$ $y_1 + y_2 \leq x_1$ $$l_a \leq x_2 \leq m_a \tag{22}$$

$l_s \leq y_1 \leq m_s$ $x_1, x_2, y_1, y_2, l_a, m_a, l_s, m_s \geq 0$

From this process, complex problems from a logical and temporal domain get converted to a constraint solving domain where efficient tools are available.

Figure 3:
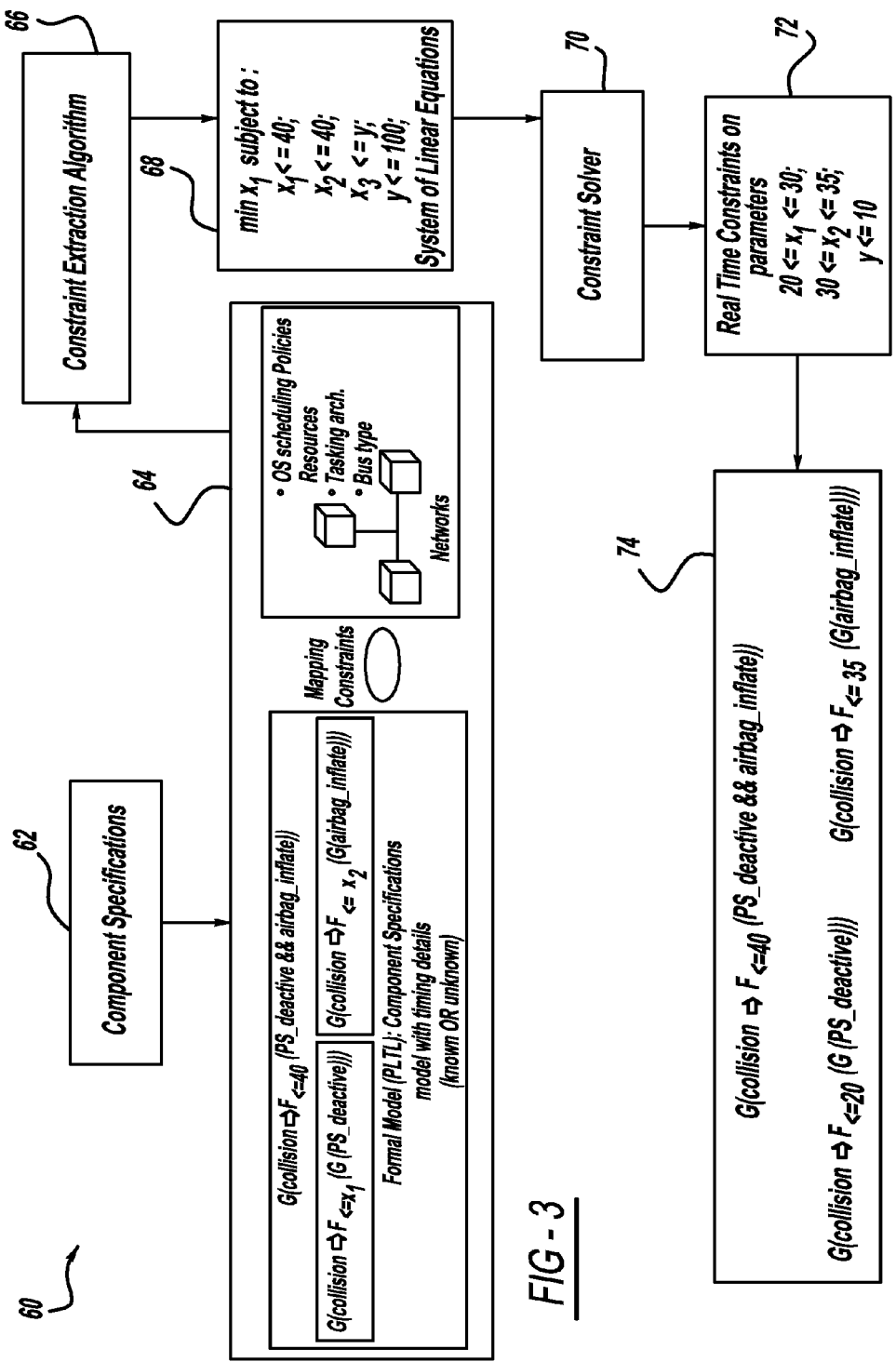
FIG. 3 is a block diagram showing a process employing mathematical representations and a constraint extraction algorithm in a system for providing timing control for devices and components in a vehicle system, according to an embodiment of the present invention.

FIG. 3 is a block diagram showing a process 60 for determining constraints, as discussed above, for component specifications to identify the timing at the specification level when developing various vehicle systems, such as collision avoidance systems and adaptive cruise control systems. At box 62, the component specifications are identified, such as the timing for the deactivation of the power steering (PS_deactivate) and deployment of the airbags (airbag-inflate), as discussed above. These component specifications are then mathematically represented at box 64 to generate a model where the component specifications are modeled with timing details. In addition, mapping constraints can be employed in the mathematical representation, such as scheduling, resources, tasking arch, bus type, etc. For these mathematical representations, a constraint extraction algorithm is provided for extracting the constraints at box 66. The system of linear equations extracted at the end of the constraint extraction algorithm contains constraints extracted from the property shown in the box 64, particularly $x_1 \leq 40$, $x_2 \leq 40$, $x_3 \leq y$ and $y \leq 100$ as shown in box 68. The latter two constraints are not explicitly modeled at the box 64, but could come from a legacy system. The system of linear equations is then sent to a constraint solver 70 that solves for a range of the constraints at box 72. This gives the relationship of the parameters $x_1$, $x_2$ and y. Values for the parameters $x_1$, $x_2$ and y are then selected at box 74 based on the ranges identified for the particular application for providing timing layouts for the system. In this embodiment, the value of the parameter $x_1$ is selected to be 20 and the value of the parameter $x_2$ is selected to be 35 so that the collision avoidance system would deactivate the power steering in 20 ms or less and deploy the airbags in 35 ms or less.

Any suitable constraint extraction algorithm can be used at the box 66 to identify the constraints. According to the invention, two possible approaches are employed when the choice of mathematical representation is the discrete-time temporal logic, particularly, a boundary discovery approach, where discrete time logic related checks are used to extract constraints, and a proof-tree approach, where a tree construction is used to extract constraints using temporal logic related checks.

Figure 4:
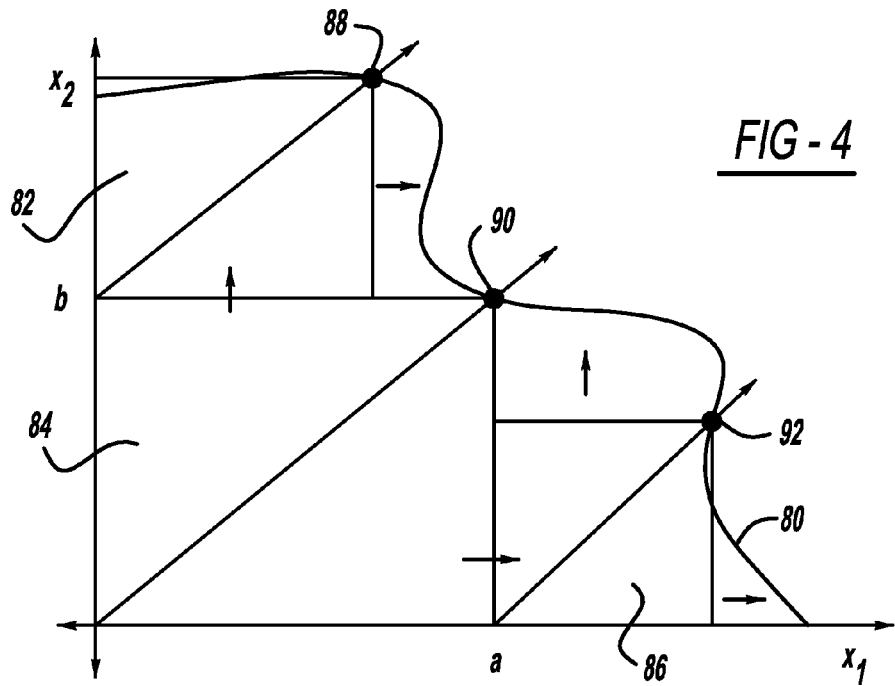
FIG. 4 is a graph showing a boundary discovery approach for use as the constraint algorithm in the system shown in FIG. 3, according to an embodiment of the present invention.

FIG. 4 is a graph with the range of values for parameter $x_1$ on the horizontal axis and the range of values for the parameter $x_2$ on the vertical axis showing a representation of how the boundary discovery approach can be used as the constraint extraction algorithm in the particular case when all of the parameters are attached only to the "Always (G)" operator in logic, according to an embodiment of the present invention. Line 80 represents a boundary outside of which solutions for the parameters $x_1$ and $x_2$ are not correct. Boxes 82, 84 and 86 represent solutions in which both the parameters $x_1$ and $x_2$ are satisfied for bounds on the response time using the system level properties that are met. The boundaries between the boxes 82, 84 and 86 represented by lines a and b are locations where a constraint is discovered, such as $x_1 \leq a$ and $y_1 \leq b$. The boxes 82, 84 and 86 are made larger until they contact the boundary line 80 at points 88, 90 and 92, respectively, at which time the size of the boxes 82, 84 and 86 are set to define the range of the constraints $x_1$ and $x_2$.

Figure 5:
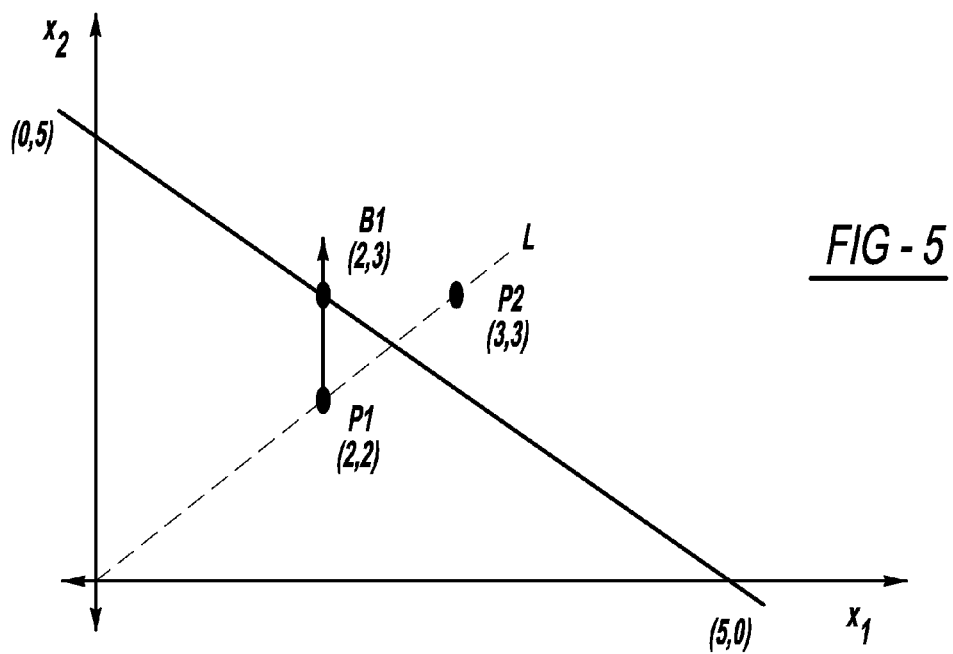
FIGS. 5-7 are graphs showing a specific example for a boundary discovery approach for the use of this constraint algorithm and the system shown in FIG. 3, according to an embodiment of the present invention.
Figure 6:
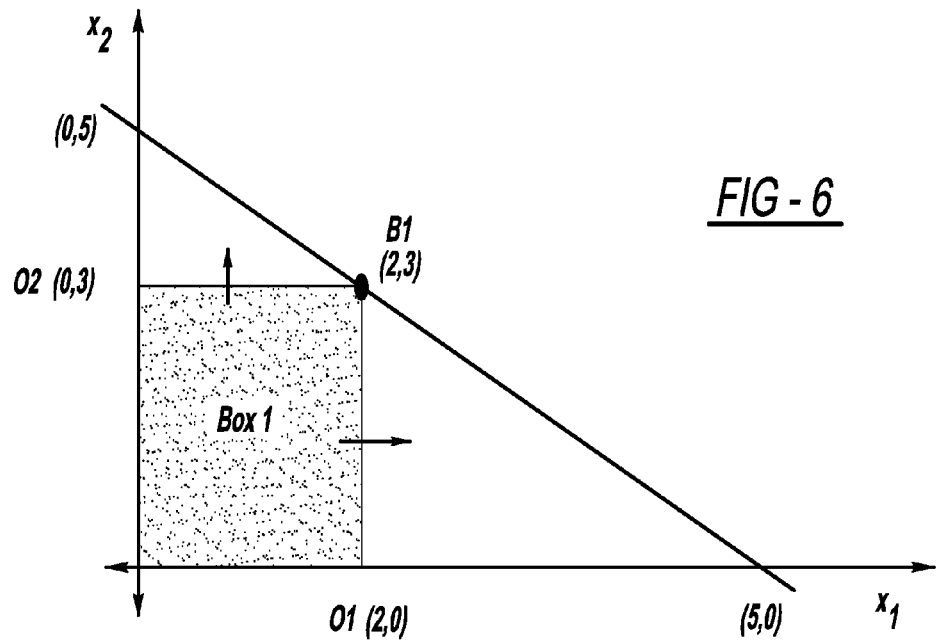
Figure 7:
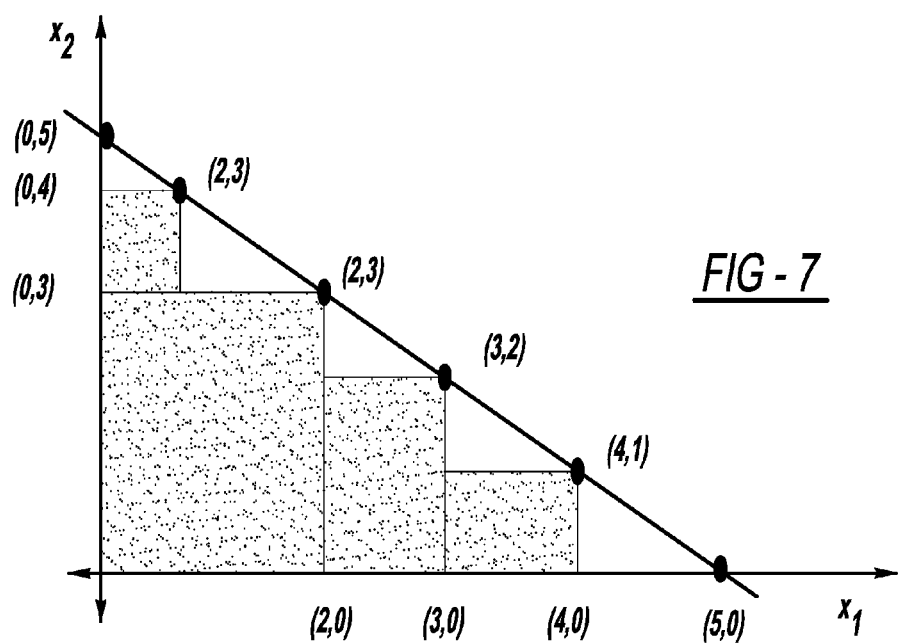

In order to more specifically describe the boundary discovery approach discussed above, a specific example is provided in the graphs of FIGS. 5-7. In a certain component interaction scenario, described by equation (23) below, $\alpha$, $\beta$ and $\gamma$ are events involved in the interaction.

$$\Gamma_1 \equiv G(\alpha \Rightarrow F_{\leq x_1}\beta) \wedge \Gamma_2 \equiv G(\beta \Rightarrow F_{\leq x_2}\gamma) \Rightarrow G(\alpha \Rightarrow F_{\leq 5}\gamma) \quad (23)$$

The constraint extraction for this example using boundary discovery is performed as follows. A search is started along line L in FIG. 5 where both the parameters are assigned the same value and the temporal validity of the assigned formula is checked to extract constraints using rules of timed temporal logic. An assignment of values to parameters is a valid solution, if the check is valid. For example, if $x_1=2$ and $x_2=2$, the validity of equation (24) is checked.

$$\Gamma_{1x_1=2} \equiv G(\alpha \Rightarrow F_{\leq 2}\beta) \wedge \Gamma_{2x_2=2} \equiv G(\beta \Rightarrow F_{\leq 2}\gamma) \Rightarrow G(a \Rightarrow F_{\leq 5}\gamma) \quad (24)$$

The search is concluded when two points P1 (2,2) and P2(3,3) in FIG. 5 are obtained such that P1 is a solution for the problem where P2 is not. Once P1 is known, equation (23) is modified as equation (25).

$$\Gamma_{1x_1=2} \equiv G(\alpha \Rightarrow F_{\leq 2}\beta) \wedge \Gamma_{2x_2} \equiv G(\beta \Rightarrow F_{\leq x_2}\gamma) \Rightarrow G(a \Rightarrow F_{\leq 5}\gamma) \quad (25)$$

Thus, equation (25) now has one less parameter. The steps above are repeated until all of the parameters have been assigned their concrete value.

When this has been completed, a point on the boundary of a solution region is obtained, indicated by B1 (2,3) for example. This helps to infer all the points obtained in box 1 shown in FIG. 6 as solution points. The generated constraint is given in equation (26) below.

$$x_1 \leq 2, x_2 \leq 3 \quad (26)$$

The above steps are repeated by shifting the origin to O1(2,0) and O2(3,0) and equation (23) is modified until all of the solution points are inferred. The direction of the search is indicated in FIG. 6. Equation (23) is modified to equation (27) below due to the shift of the origin to O1(2,0).

$$\Gamma_1 \equiv G(\alpha \Rightarrow F_{\leq x_1+2}\beta) \wedge \Gamma_2 \equiv G(\beta \Rightarrow F_{\leq x_2}\gamma) \Rightarrow G(a \Rightarrow F_{\leq 5}\gamma) \quad (27)$$

A similar modification is done to equation (23) where the origin is shifted to O2(0,3). Thus, the boundary discovery covers all of the points in the solution region using boundary boxes as shown in FIG. 7. The discovered constraints for the given example can be shown in equation (28) below.

$$\{x_1 \leq 2 \wedge x_2 \leq 3, 2 \leq x_1 \leq 3 \wedge 0 \leq x_2 \leq 2,$$
$$3 \leq x_1 \leq 4 \wedge 0 \leq x_2 \leq 1, x_1 = 5 \wedge x_2 = 0,$$
$$0 \leq x_1 \leq 1 \wedge 4 \leq x_2 \leq 5, x_1 = 0 \wedge x_2 = 5\} \quad (28)$$

Figure 8:
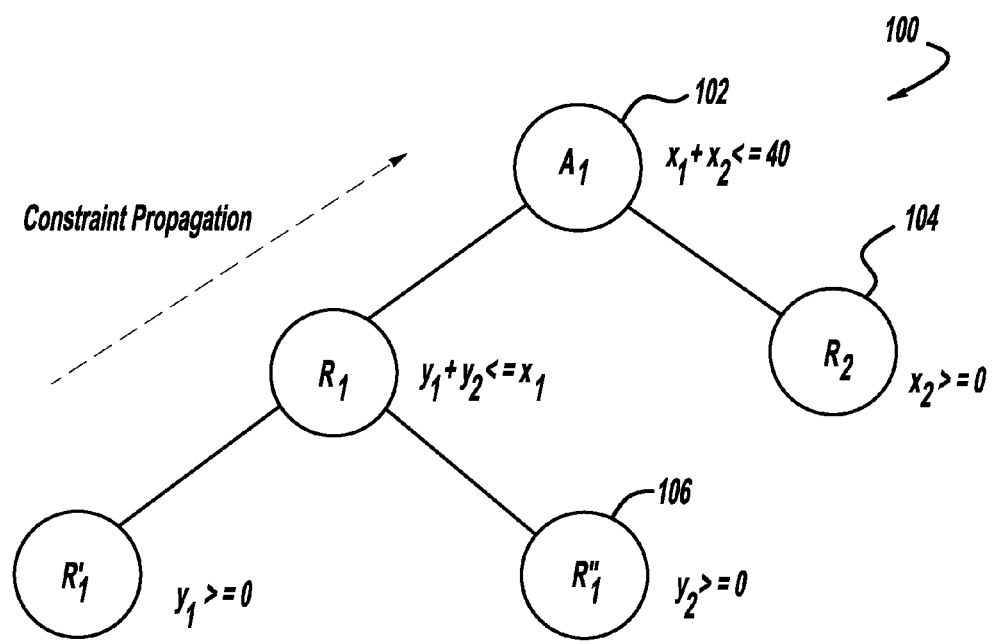
FIG. 8 is a plan view of a proof-tree architecture showing a process of constraint extraction for the system shown in FIG. 3, according to another embodiment of the present invention.

FIG. 8 is a diagram of a proof-tree 100 that can be used for the constraint extraction algorithm referred to above for the steer-by-wire system, according to another embodiment of the present invention. The proof-tree 100 includes nodes, where each node is labeled with a system or a sub-system level specification from the example given above. In this example, a root node 102 is labeled with the system level specification $A_1$, a next layer of nodes 104 is labeled with the sub-system level specification $R_1$ and $R_2$, and a third level of nodes 106 is labeled with the refined sub-system level specifications $R'_1$ and $R''_1$.

At each internal node, the constraints are extracted for timing relationships between property corresponding to that node and one of the child nodes. The extracted constraints are shown next to each node. The extracted constraints are propagated to the root node 102 in order. Building the proof-tree 100 includes iteratively building a tree or picking up properties from finer level subdivisions of the system. The choice of properties is made in such a way that untimed design intent for every internal node is covered by its two children nodes. At each internal node, the constraints are extracted for timing relationships between properties corresponding to this node and the ones for the children nodes. The process propagates the extracted constraints to the root node 102 by doing an in-order transversal.

The specific pattern language for the proof-tree methodology can be given as:

$$P = \{F_{\leq x}(\phi \Rightarrow \psi), G(\phi \Rightarrow \psi), F_{\leq x}(\phi \Rightarrow G\psi), F_{\leq x} (G\phi \Rightarrow \psi), G(\phi \Rightarrow F_{\leq x}\psi), G(\phi \Rightarrow F_{\leq x}G\psi)\} \quad (29)$$

The methodology for this language can be given as:
1. For each member $\Phi \in A$,
   Construct proof-tree $T_\Phi$. The proof-tree $T_\Phi$ satisfies additional constraints that all its inner nodes are members of R.
   Extract linear constraints, $C_\Phi$ from $T_\Phi$.
2. If $C_\Phi$ exists, solve $(\{C_\Phi/\Phi \in A\}, 0)$.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for defining timing relationships for components in a system at a system design level, said method comprising:

executing, using at least one computing device coupled to a memory, instructions for:
defining component timing specifications at a system level and at a sub-system level, wherein the component timing specifications are timing specifications for a collision avoidance system in a vehicle;
mathematically representing the timing specifications in a system model;
providing a constraint extraction algorithm that extracts timing constraints from the mathematical representations;
refining sub-system level specifications so as to extract more constraints using the constraint extraction algorithm;
using the constraint extraction algorithm to generate a plurality of linear equations that define the constraints;
solving for real time constraint ranges from parameters in the linear equations; and
selecting values from the real time constraint ranges to be used in the mathematical representations.

2. The method according to claim 1 wherein providing a constraint extraction algorithm includes providing a boundary discovery approach algorithm that identifies the constraints by defining a boundary line beyond which a constraint is not valid and expanding constraint boxes until they reach the boundary line.

3. The method according to claim 1 wherein providing a constraint extraction algorithm includes using a proof-tree algorithm including a root node identified by one of the system level specifications and children nodes defined by a plurality of the sub-system level specifications.

4. The method according to claim 3 wherein using a proof-tree algorithm includes using the proof-tree algorithm to extract the constraints by propagating through the proof-tree from lower level nodes to the root node.

5. The method according to claim 3 wherein using the proof-tree algorithm includes extracting constraints for timing relationships between property corresponding to a particular node and one of its child nodes.

6. The method according to claim 1 wherein mathematically representing the timing specifications in a system model includes mapping constraints to a network.

7. The method according to claim 6 wherein mapping the constraints to a network includes using a process selected from the group consisting of scheduling, resources, tasking arch and bus type.

8. The method according to claim 1 wherein the component timing specifications include timing for deactivating the power steering of a vehicle and deploying airbags.

9. A method for defining timing relationships of components in a system at a system design level, said method comprising:
executing, using at least one computing device coupled to a memory, instructions for:
defining component timing specifications at a system level and at a sub-system level, wherein the component timing specifications are timing specifications for a collision avoidance system in a vehicle;
refining sub-system level specifications so as to extract more constraints using the constraint extraction algorithm;
mathematically representing the timing specifications in a system model; and
extracting constraints from the mathematical representations using a constraint extraction algorithm so as to define the timing relationships of various components and devices in the system.

10. The method according to claim 9 wherein the constraint extraction algorithm is a boundary discovery approach algorithm that identifies the constraints by defining a boundary line beyond which a constraint is not valid.

11. The method according to claim 9 wherein the constraint extraction algorithm is a proof-tree algorithm including a root node identified by one of the system level specifications and root nodes defined by a plurality of the sub-system level specifications.

12. A system for defining timing relationships of components in a system at a system design level, said method comprising:
means for defining component timing specifications at a system level and at a sub-system level;
means for mathematically representing the timing specifications in a system model;
means for providing a constraint extraction algorithm that extracts timing constraints from the mathematical representations;
means for using the constraint extraction algorithm to generate a plurality of linear equations that define the constraints;
means for solving for real time constraint ranges from parameters in the linear equations; and
means for selecting values from the real time constraint ranges to be used in the mathematical representations.

13. The system according to claim 12 wherein the means for providing a constraint extraction algorithm includes means for providing a boundary discovery approach algorithm that identifies the constraints by defining a boundary line beyond which a constraint is not valid and expanding constraint boxes until they reach the boundary line.

14. The system according to claim 12 wherein the means for providing a constraint extraction algorithm includes means for using a proof-tree algorithm including a root node identified by one of the system level specifications and children nodes defined by a plurality of the sub-system level specifications.

15. The system according to claim 12 further comprising means for refining sub-system level specifications so as to extract more constraints using the constraint extraction algorithm.

16. The system according to claim 12 wherein the means for mathematically representing the timing specifications in a system model includes means for mapping constraints to a network.

* * * * *